United States Patent [19]

Chang et al.

[11] 4,029,627
[45] June 14, 1977

[54] OLIGOMERIC POLYESTERS FROM LONG-CHAIN DICARBOXYLIC ACIDS AS PLASTICIZERS FOR VINYL POLYMERS

[75] Inventors: Shu-Pei Chang, Peoria, Ill.; Robert W. Ridgway, Winter Park, Fla.

[73] Assignee: The United States of America as represented by the Secretary of Agriculture, Washington, D.C.

[22] Filed: Dec. 28, 1976

[21] Appl. No.: 754,940

Related U.S. Application Data

[63] Continuation-in-part of Ser. No. 611,374, Sept. 8, 1975, abandoned.

[52] U.S. Cl. .............................. 260/31.6; 106/316; 260/31.8 C; 252/364
[51] Int. Cl.² .......................................... C08K 5/10
[58] Field of Search ......... 252/364; 260/31.6, 31.8; 106/311, 316

[56] References Cited

UNITED STATES PATENTS 2,815,354   12/1957   Wilkinson et al. .............. 260/31.6

FOREIGN PATENTS OR APPLICATIONS 560,036   7/1958   Canada ........................... 260/31.6

*Primary Examiner*—Leland A. Sebastian
*Attorney, Agent, or Firm*—M. Howard Silverstein; David G. McConnell; Curtis P. Ribando

[57] ABSTRACT

Vinyl polymers are plasticized by incorporating therewith a composition comprising condensates having the structure:

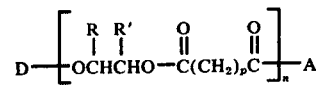

wherein $n$ is from 2 to 15, D is either

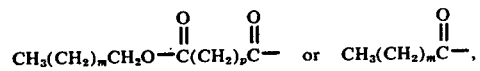

A is either

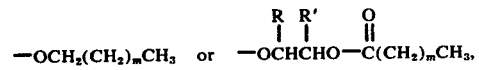

$m$ is from 2 to 10, $p$ in each of said condensates is 11 or 7 or admixtures thereof with the proviso that condensates wherein $p$ is exclusively 7 are admixed with those having $p$ equal to 11, and R and R' are either -H or -CH$_3$, with the proviso that R and R' on adjacent carbon atoms are not the same. The preferred species is α-lauroyl-ω-[(propylenedioxy)lauroyl]poly[(propylenedioxy) brassyloyl], alternatively, lauric acid terminated poly[propylene brassylate]. The plasticizers are prepared by condensation polymerization, either of brassylic acid or a mixture of brassylic acid and azelaic acid, with propylene glycol in the presence of a terminator, e.g., monocarboxy- or hydroxyl-substituted alkane.

9 Claims, No Drawings

OLIGOMERIC POLYESTERS FROM LONG-CHAIN DICARBOXYLIC ACIDS AS PLASTICIZERS FOR VINYL POLYMERS

CROSS-REFERENCES TO RELATED APPLICATIONS

This application is a continuation-in-part of application Ser. No. 611,374, filed Sept. 8, 1975, now abandoned.

BACKGROUND OF THE INVENTION

1. Field of the Invention

This invention relates to linear, saturated, and terminated oligomeric plasticizers for vinyl polymers. More particularly, it relates to linear polyesters formed from the condensation of a dihydric alcohol, a dibasic acid and a monofunctional terminator, e.g., a fatty acid or a monohydroxy-substituted alkane.

2. Description of the Prior Art

Brice et al. [Soc. Petrol. Eng. J. 19: 984 (1963)] disclose linear, saturated polyester plasticizers produced by condensation polymerization of a dihydric alcohol such as propylene glycol with a dibasic acid having up to 10 carbon atoms, each oligomer terminated by a terminator fatty acid such as lauric acid.

Diester or "monomeric" plasticizers have been prepared from mixed crambe dibasic acids and from brassylic acid [Nieschlag et al., I+EC Prod. Res. Develop. 6: 201 (1967) and 3: 146 (1964)].

SUMMARY OF THE INVENTION

Applicants have discovered that condensation of propylene glycol and either (a) brassylic acid or (b) a mixture of brassylic acid and azelaic acid, with oligomer formation terminated at from 2 to 15 repeating units by a fatty acid or alcohol, will yield polyester condensate plasticizers having unexpected improvements in migration loss and 100% modulus when compared to trends exhibited by the same plasticizers containing $C_6$ to $C_{10}$ dibasic acids. Brassylic acid or brassylic-azelaic acid mixtures are readily available from crambe oil by known methods. Thus, the plasticizer products herein may be produced in large part from renewable resources. Further, the plasticizers are excellent replacements for traditional plasticizers in auto upholstery, food packaging materials and blood storage bags, featuring low volatility, better permanence and good performance.

DETAILED DESCRIPTION OF THE INVENTION

Specifically, the polyester condensates of the invention are of the structure:

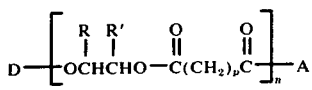

wherein $n$ is from 2 to 15, D is either

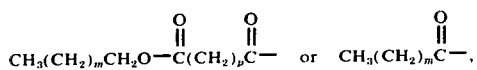

A is either

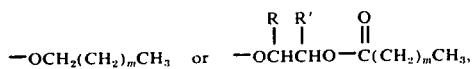

$m$ is from 2 to 10, p in each of said condensates is 11 or 7 or admixtures thereof, with the proviso that condensates wherein $p$ is exclusively 7 are admixed with those having $p$ equal to 11, and R and R' are either —H or —$CH_3$, with the proviso that R and R' on adjacent carbon atoms are not the same.

Hence, polyester condensates containing as the dibasic residue only brassylic acid, or mixtures of brassylic acid and azelaic acid, as well as condensates containing only azelaic acid admixed with condensates containing brassylic acid as the dibasic residue are within the scope of the invention.

The condensate plasticizers are produced by a known method from dicarboxylic acid and propylene glycol in the presence of a terminator fatty acid or alcohol. This method provides for approximating the degree of polymerization (n) at from 2 to 15 by charging reactants according to the relationship n = 2 [dicarboxylic acid]/[terminator]. The dicarboxylic acids brassylic and azelaic acid may be obtained by saponification and oxidative ozonolysis of crambe oil or other oil containing a high concentration of erucic acid (Nieschlag et al., 1967, supra).

The following example is provided to illustrate the invention and to compare it with prior art plasticizers.

EXAMPLE

Preparation and Characterization of Condensate

Seventeen oligomeric polyesters were prepared via condensation polymerization of various dicarboxylic acids with propylene glycol in the presence of a terminator acid or alcohol. Brassylic acid was 95.2% $C_{13}$ by GLC. Crambe mixed dicarboxylic acids were 31.3% $C_9$, 46.6% $C_{13}$, 15.4% homologous dicarboxylic acids, and 6.7% others. Adipic ($C_6$) acid, sebacic ($C_{10}$) acid and azelaic acid (alone) were also evaluated as representative of prior art polyester components. A single example illustrates conditions. Brassylic acid (0.4 mole), propylene glycol (0.8 mole), lauric acid (0.4 mole), zinc chloride (0.15 g.), and toluene (50 ml.) were charged to a 500-ml. reaction vessel and heated under positive nitrogen pressure. All reactants dissolved at about 100° C., and reflux began at about 140° C. Thereafter, the reaction temperature was raised slowly to 220° C. by withdrawing toluene through a Barrett trap. Reaction times were measured from first reflux to 1 hour after no further water collected. After completion of polyesterification, the mixture was slowly heated to 230° C. under 1 to 2 mm. Hg and held at that temperature to remove all volatiles. The resulting viscous liquid was cooled to 80° C., mixed with 15 g. filter aid, and filtered. If necessary, suspended material that appeared in the product after several months storage at room temperature was separated with a Spinco ultracentrifuge (Bechman Instruments, Inc.), Model L, Rotor No. 30, at 30,000 r.p.m. for 30 minutes with samples at room temperature; recovery, ca. 90%.

Acid, hydroxyl value, and saponification equivalent were determined according to reported methods. The vapor pressure of benzene affected by polyester solutes at three concentrations was measured with a Mechrolab Model 301A vapor pressure osmometer. Number-average molecular weights ($\overline{M}n$) were calculated after extrapolating the data to zero concentration. Monodisperse ($\overline{M}w/\overline{M}n<1.1$) polystyrenes, ArRo 500-2 and ArRo 500-6 with $\overline{M}n$ of 555 and 2115, respectively, served as standards. Viscosity was measured with a Brookfield Synchro-Lectric viscometer, Model LVT, at 25° C. Measurements were made with the same spindle at three speeds to detect non-Newtonian behavior. The seventeen polyesters prepared are characterized in ity, the test films were evaluated visually and compared by color with films whose heat stabilities could be measured directly. Compatibility numbers were calculated in keeping with the emperical relationship noted by Riser and Palm, Polym. Eng. Sci. 7: 110 (1967).

The results of the foregoing tests, using 16 polyester plasticizers, are set forth in Table 2.

Table 1

| | Polyesterification Charge | | | | | | Purified Products | | | |
|---|---|---|---|---|---|---|---|---|---|---|
| No. | Reactants[a] | Mole ratio | $N^b$ | Rx time (hr.) | Acid value | Hydroxyl value | Sapon. equiv. (calcd.) | No. Average mol. wt. (calcd.) | Viscosity (cp.) | Color Gardner |
| 1 | B/G/L | 1/2/1 | 2 | 4.5 | 5 | 16 | 170(168) | 1900(1008) | 246 | 2 |
| 2 | B/G/L | 2.5/5/1 | 5 | 6.0 | 2 | 11 | 156(155) | 2100(1860) | N.N.[d] | 1-2 |
| 3 | B/G/L | 2.5/5/1[c] | 5 | 11.0 | 1 | 19 | 153(155) | 1800(1860) | 4670 | 5 |
| 4 | B/G/V | 2.5/3.75/1 | 5 | 30.0 | 4 | 8 | 155(151) | 2100(1816) | 2570 | 5 |
| 5 | B/G/L | 5/7.5/1 | 10 | — | 2 | 20 | 152(149) | 2200(3280) | 3845 | 2-3 |
| 6 | B/G/P | 5/6.2/1 | 10 | — | 28 | 24 | 145(145) | 2100(3196) | 2370 | 5 |
| 7 | B/G/L | 7.5/15/1 | 15 | 8.0 | 8 | 28 | 150(147) | 2300(4700) | 10000 | 5 |
| 8 | C/G/L | 1/2/1 | 2 | 8.0 | 23 | 6 | 163(165) | 1200(990) | 170 | 9 |
| 9 | C/G/P | 1/2/1 | 2 | 6.5 | 5 | 3 | 150(151) | 1800(906) | 207 | 6 |
| 10 | C/G/L | 2.5/5/1 | 5 | 6.0 | 8 | 6 | 149(151) | 1900(1815) | 555 | 10 |
| 11 | C/G/L | 5/10/1 | 10 | 7.0 | 4 | 9 | 144(145) | 2100(3190) | 1830 | 10 |
| 12 | S/G/L | 2.5/5/1 | 5 | 12.0 | 29 | 10 | 140(137) | 2000(1650) | 2040 | 10 |
| 13 | Z/G/L | 1/2/1 | 2 | 11.5 | 1 | 7 | 151(149) | 1700(896) | 160 | 1-2 |
| 14 | Z/G/L | 2.5/5/1 | 5 | 9.8 | 4 | 5 | 134(132) | 2100(1580) | 769 | 1-2 |
| 15 | Z/G/L | 5/10/1 | 10 | 10.0 | 3 | 15 | 126(124) | 2200(1720) | 2920 | 1-2 |
| 16 | A/G/L | 2.5/5/1 | 5 | 7.8 | 3 | 11 | 116(114) | 1800(1370) | 634 | 1 |
| 17 | B/G/D | 3/2.5/1 | 5 | 16.0 | 5 | 95 | 170(167) | — | — | 6 |

[a]B = brassylic acid, C = crambe mixed dicarboxylic acids, S = sebacic acid, Z = azelaic acid, A = adipic acid, G = propylene glycol, L = lauric acid, V = 5-phenyl valeric acid, P = pelargonic acid, D = dodecyl alcohol.
[b]The degree of polymerization. Calculated by 2(dicarboxylic acid charged)/(terminator charged).
[c]p-Toluenesulfonic acid monohydrate as catalyst.
[d]Non-Newtonian. At 6, 12, and 30 r.p.m. the observed viscosities were 4280, 3600, and 2900 cp., respectively, indicative of pseudo-plastic behavior.

Table 2

| | | Torsional stiffness | | Compatibility number | Permanence | | Performance | | | |
|---|---|---|---|---|---|---|---|---|---|---|
| No. | Plasticizer[a] (idealized structure) | $T_F$ (° C.) | $T_4$ (° C.) | $T_4$-$T_F$ | Migration loss (%) | Volatility loss (%) | Tensile strength (p.s.i.) | Ultimate elongation (%) | 100% modulus (p.s.i.) | Heat stability (hr.) |
| 1 | L-(G-B)$_2$-G-L | −27 | 13 | 40 | 7.7 | 1.2 | 2715 | 290 | 1470 | 7.0 |
| 2 | L-(G-B)$_5$-G-L | −21 | 13 | 34 | 3.3 | 0.9 | 2795 | 215 | 1650 | 5.5 |
| 3 | L-(G-B)$_5$-G-L | −21 | 20 | 41[b] | 6.2 | 4.2 | 2350 | 230 | 1570 | 8.0 |
| 4 | V-(G-B)$_5$-G-V | −15 | 14 | 29 | 1.3 | 0.8 | 2520 | 230 | 1425 | 4.0 |
| 5 | L-(G-B)$_{10}$-G-L | −16 | 15 | 31 | 1.9 | 0.5 | 2945 | 275 | 1715 | 8.0 |
| 6 | P-(G-B)$_{10}$-G-P | −16 | 18 | 34 | 1.8 | 0.7 | 2540 | 240 | 1720 | 4.0 |
| 7 | L-(G-B)$_{15}$-G-L | −17 | 18 | 35 | 1.1 | 0.5 | 2265 | 175 | 1610 | 2.5 |
| 8 | L-(G-C)$_2$-G-L | −30 | 14 | 44 | 9.7 | 2.5 | 2395 | 235 | 1460 | 5.0 |
| 9 | P-(G-C)$_2$G-P | −27 | 4 | 31 | 6.4 | 2.2 | 2970 | 255 | 1460 | 6.0 |
| 10 | L-(G-C)$_5$-G-L | −23 | 10 | 33 | 3.8 | 0.7 | 2890 | 300 | 1550 | 5.5 |
| 11 | L-(G-C)$_{10}$G-L | −19 | 13 | 32 | 2.1 | 0.6 | 2950 | 260 | 1595 | 3.0 |
| 12 | L-(G-S)$_5$-G-L | −21 | 12 | 33 | 3.7 | 1.1 | 2950 | 180 | 1525 | 4.0 |
| 13 | L-(G-Z)$_2$-G-L | −30 | 6 | 36 | 6.3 | 1.0 | 2240 | 195 | 1205 | 7.0 |
| 14 | L-(G-Z)$_5$-G-L | −19 | 9 | 28 | 2.9 | 0.8 | 3175 | 255 | 1635 | 2.5 |
| 15 | L-(G-Z)$_{10}$-G-L | −13 | 13 | 26 | 0.9 | 0.3 | 2640 | 245 | 1500 | 4.0 |
| 16 | L-(G-A)$_5$-G-L | −15 | 10 | 25 | 2.2 | 0.8 | 3235 | 270 | 1675 | 6.5 |
| Control | Plastolein 9720 | −21 | 8 | 29 | 3.5 | 1.4 | 2705 | 270 | 1315 | 5.0 |
| Control | DOP | −26 | 0 | 26 | 4.3 | 1.6 | 2890 | 270 | 1260 | 6.4 |

[a]B = Brassyloyl, C = acyls of crambe mixed dicarboxylic acids, S = sebacoyl, Z = azelaoyl, A = adipoyl, G = propylenedioxy, L = lauroyl, V = 5-phenyl valeryl, P = pelargonoyl, D = Dodecoxy, plastolein 9720 = polymeric plasticizer from Emery, DOP = bis(2-ethylhexyl)phthalate.
[b]After 1 month moderate exudation occurred from polyester prepared using p-toluenesulfonic acid monohydrate as catalyst.

Table 1.

Evaluation of Condensates as Plasticizers

Plasticized PVC films for visual evaluation were cast in 10-cm. petri dishes from tetrahydrofuran solution. Each contained 15 g. of Geon 102 (10% by weight) and polyester plasticizer at 20% and 50% levels. Comparison films were prepared in the same manner with bis(2-ethylhexyl) phthalate (DOP) at 10%, 20%, 30%, 40%, and 50% levels.

Test PVC sheets were prepared according to known procedures. Torsional stiffness (ASTM D1043-69), migration and volatility losses (ASTM D1203-67), tensile properties (ASTM D412-68), and heat stability were determined by the given standard or known tests. When changes in sample surface upon heating prevented spectrophotometric measurement of heat stabil-

We claim:
1. Vinyl polymer plasticizer compositions comprising condensates having the structure:

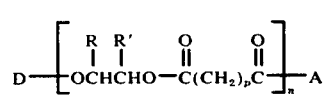

wherein $n$ is from 2 to 15, D is either

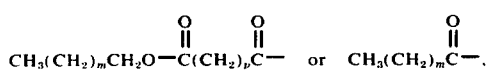

A is either

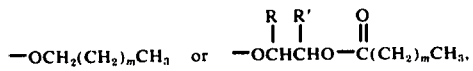

$m$ is from 2 to 10, p in each of said condensates is 11 or 7 or admixtures thereof, with the proviso that condensates wherein p is exclusively 7 are admixed with those having p equal to 11, and R and R' are either —H or —CH$_3$, with the proviso that R and R' on adjacent carbon atoms are not the same.

2. A composition as described in claim 1 wherein $p$ is a mixture of 11 and 7.

3. A composition as described in claim 1 wherein $p$ is 11.

4. A composition as described in claim 1 wherein D is

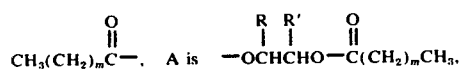

$p$ is 11 and m is 10.

5. A plasticized vinyl polymer composition comprising
   a. a vinyl polymer, and
   b. incorporated with said polymer a plasticizer composition comprising condensates having the structure:

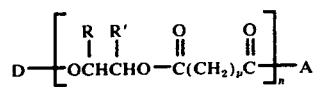

wherein $n$ is from 2 to 15, D is either

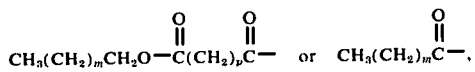

A is either

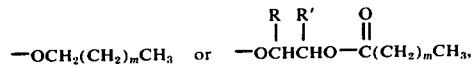

$m$ is from 2 to 10, $p$ in each of said condensates is 11 or 7 or admixtures thereof, with the proviso that condensates wherein $p$ is exclusively 7 are admixed with those having p equal to 11, and R and R' are either —H or —CH$_3$, with the proviso that R and R' on adjacent carbon atoms are not the same.

6. The polymer composition as described in claim 5 wherein p in the plasticizer composition is a mixture of 11 and 7.

7. The polymer composition as described in claim 5 wherein p in the plasticizer composition is 11.

8. The polymer composition as described in claim 5 wherein D is

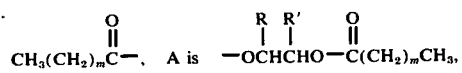

$p$ is 11, and $m$ is 10.

9. The polymer composition as described in claim 5 wherein the vinyl polymer is polyvinyl chloride.

* * * * *